April 23, 1935.  K. R. MANVILLE  1,998,513
GEAR SHIFTER LOCK
Filed Nov. 23, 1934
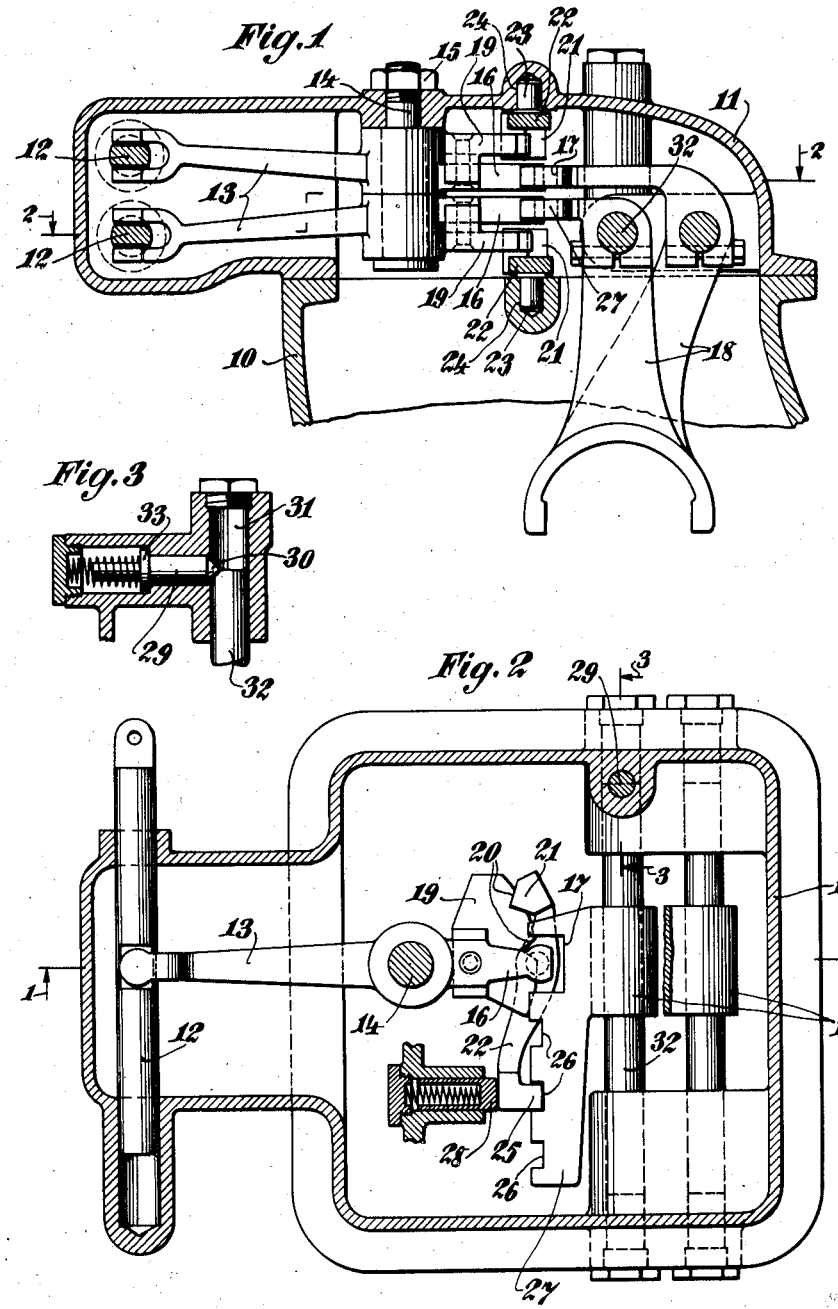
INVENTOR.
Keith R. Manville
BY
HIS ATTORNEYS Patented Apr. 23, 1935

1,998,513

UNITED STATES PATENT OFFICE 1,998,513

GEAR SHIFTER LOCK

Keith R. Manville, Highland Park, N. J., assignor to International Motor Company, New York, N. Y., a corporation of Delaware Application November 23, 1934, Serial No. 754,419

3 Claims. (Cl. 74—475)

The present invention relates to locking mechanisms for change speed devices and embodies, more specifically, an improved locking mechanism by means of which transmission shifting elements may be locked in predetermined positions and automatically unlocked upon the initiation of an operation involving the actuation of the respective elements. More particularly, the invention relates to locking mechanisms wherein motion of the shifter lever of a vehicle transmission is utilized to effect operation of the locking mechanism prior to the actual shifting operation to be perfected.

Devices are now available for locking shifting mechanism in predetermined positions and some forms of these devices utilize the initial movement of the shifting lever to effect actuation of the locking means. It is with this particular form of mechanism that the present invention is concerned and this invention provides a locking mechanism which locks the parts more effectively in predetermined positions than in existing devices, the elements of the present invention being structurally more simple and more readily adaptable for use in transmission mechanisms than the present devices.

Accordingly, an object of the present invention is to provide a locking mechanism for gear shifting devices wherein means is provided to utilize the initial motion of the shifting lever to accommodate actuation of the locking mechanism, the locking mechanism being simple of construction and operation, readily adaptable for use in transmission mechanisms, and being positive in maintaining the elements of a gear shifting device in locked position.

The structure by means of which the present invention is attained includes quadrants or equivalent cam mechanisms mounted upon the shifter levers of the gear shifting mechanism, these levers also being formed with fingers which have lost motion connections with the shifter forks, the extent of lost motion between the shifter forks and levers being just sufficient to permit the cam quadrant to actuate the locking mechanism which is formed as a rocking member having a V-shaped lifter engaging the cam quadrant and a detent engaging respective portions of the shifter fork.

Further objects, not specifically enumerated above, will be apparent as the invention is described in greater detail in connection with the accompanying drawing, wherein:

Figure 1 is a view in transverse section, taken through the upper portion of the transmission mechanism and showing a device constructed in accordance with the present invention. This section is taken on the line 1—1 of Figure 2, looking in the direction of the arrows.

Figure 2 is a view in horizontal section, taken on line 2—2 of Figure 1, and showing the locking mechanism in plan.

Figure 3 is a detail view in section, showing the reverse stop mechanism of the present invention.

With reference to the above drawing, a transmission housing is shown at 10 and is provided with a cover 11 within which shifter rods 12 are slidably mounted. Shifter levers 13 are actuated by the shifter rods 12 and are journaled upon a shaft 14 which is secured in the cover 11 by means of a nut 15. The ends of the levers 13 away from the shafts 12 are formed with shifter fingers 16 which are adapted to engage recesses 17, formed in shifter forks 18.

The recesses 17 are sufficiently large to provide a desired lost motion between the fingers 16 and the shifter forks 18, the extent of this lost motion being just sufficient to permit the operation to be described hereinafter.

Upon the shifter fingers 16 are secured quadrant shaped cams 19, the cams being formed with recesses 20 which are adapted to receive V-shaped lifters 21, formed upon rocking members 22. The rocking members 22 are journaled in the cover or transmission mechanism in any convenient way as, for example, by means of studs 23 which are formed upon the rocking members and received in suitable recesses 24 in the cover and transmission housing.

The ends of the rocking members 22 are formed with detents 25 which are adapted to engage recesses 26, formed in extensions 27 of the shifter forks 18. Spring-pressed plungers 28 are mounted within the housing and cover and are adapted to engage the rocking members to urge the same normally into locking position. Also, a spring-pressed detent 29 is mounted within the cover and formed with a conical end 30 which extends into the cylindrical bearing 31 within which the shifter fork guide 32 for the reverse shifter fork is slidably received. In shifting into reverse position, the end of the guide 32 engages the conical surface of the detent 29 and resists such motion during the initial stage thereof. After the conical surface has ridden up onto the cylindrical surface of the guide 32, such resistance ceases and completion of the reverse shifting operation is permitted. In order that the detent 29 may be located effectively, it is formed with a flange 33 which engages a portion of the cover structure, as illustrated in Figure 3, thus preventing motion of the detent toward the guide beyond the predetermined point.

In operation, it will be seen that the initial motion of the shifter rod will cause the shifter lever and corresponding shifter finger to move the cam quadrant 19 and thus move the rocking member 22 to lift the detent 25 from one of the notches 26. Such motion takes place during the time that the shifter fingers 16 move into engagement with one of the sides of the recess 17. As the finger 16 moves into engagement with such side the detent 25 is out of the recess 26 in which it previously lay and further motion of the mechanism thus effects the desired shifting operation. By properly spacing the recesses 20 on the cam quadrant 19 and the recesses 26 on the extension 27 of the shifter forks, the elements may be locked in each position to which they are shifted.

While the invention has been described with specific reference to the accompanying drawing, it is not to be limited, save as defined in the appended claims.

I claim as my invention:

1. A locking mechanism for a gear shifting device having a shifter finger and a shifter fork formed with a recess in which the finger is adapted to be received with capacity for lost motion, comprising locking means mounted movably on a fixed part of the mechanism, means on the finger to engage and actuate the locking means upon initial movement of the finger, and means on the locking means to engage the shifter fork.

2. A locking mechanism for a gear shifting device having a shifter finger and a shifter fork formed with a recess in which the finger is adapted to be received with capacity for lost motion, comprising a rock bar pivoted on a fixed part of the mechanism, a notched cam quadrant on the finger, a pressure member on the bar adapted to engage the quadrant, a detent on the bar, and recesses in the fork adapted to be engaged by the detent.

3. A locking mechanism for a gear shifting device having a shifter finger and a shifter fork formed with a recess in which the finger is adapted to be received with capacity for lost motion, comprising a rock bar pivoted on a fixed part of the mechanism, a notched cam quadrant on the finger, the cam surface of the quadrant being curved about the axis of motion of the finger, a pressure member on the bar adapted to engage the quadrant, a detent on the bar, and recesses in the fork adapted to be engaged by the detent.

KEITH R. MANVILLE.